Figure 5:
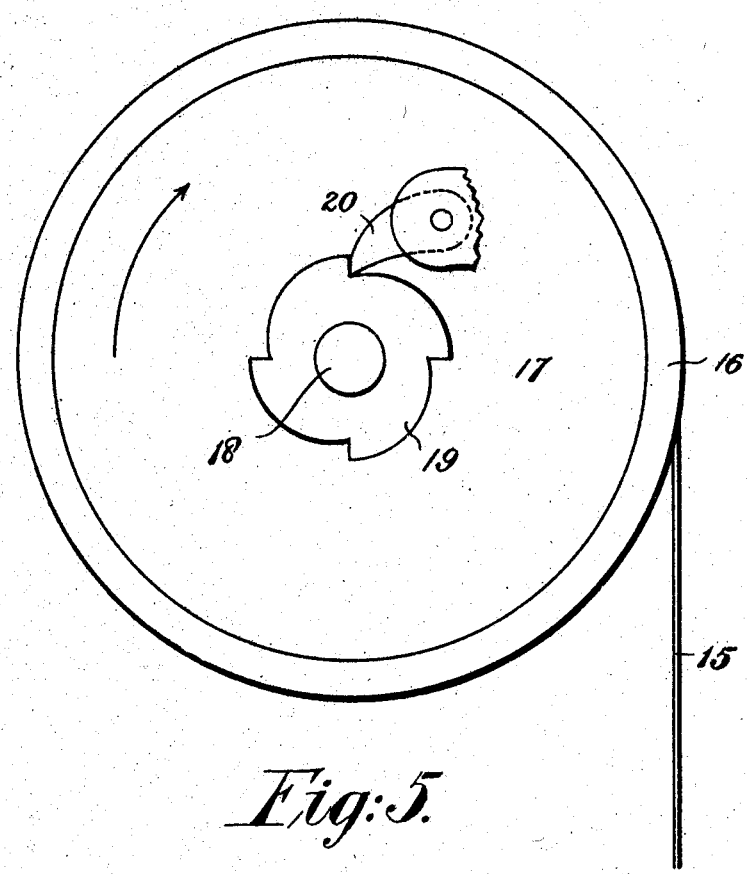

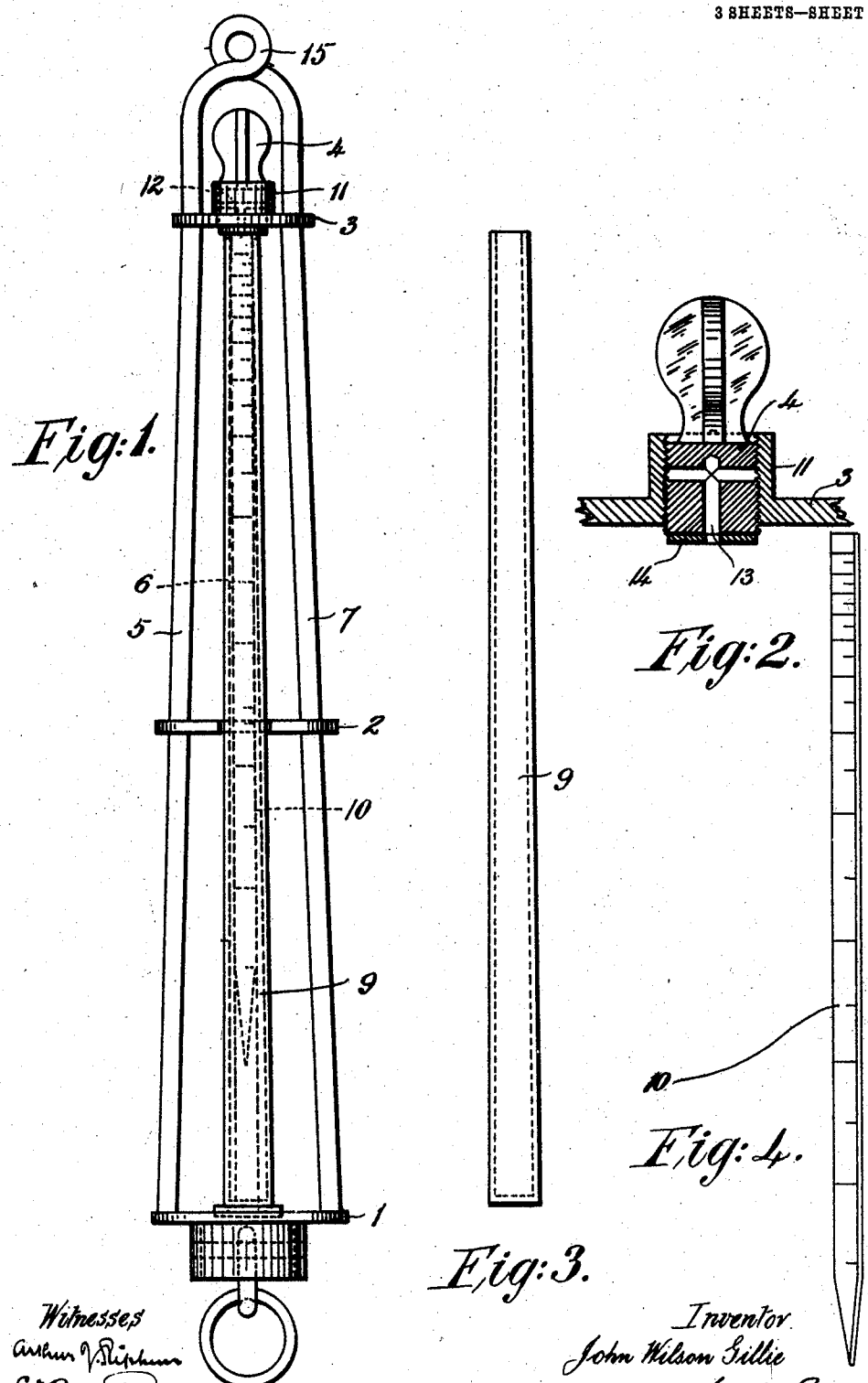

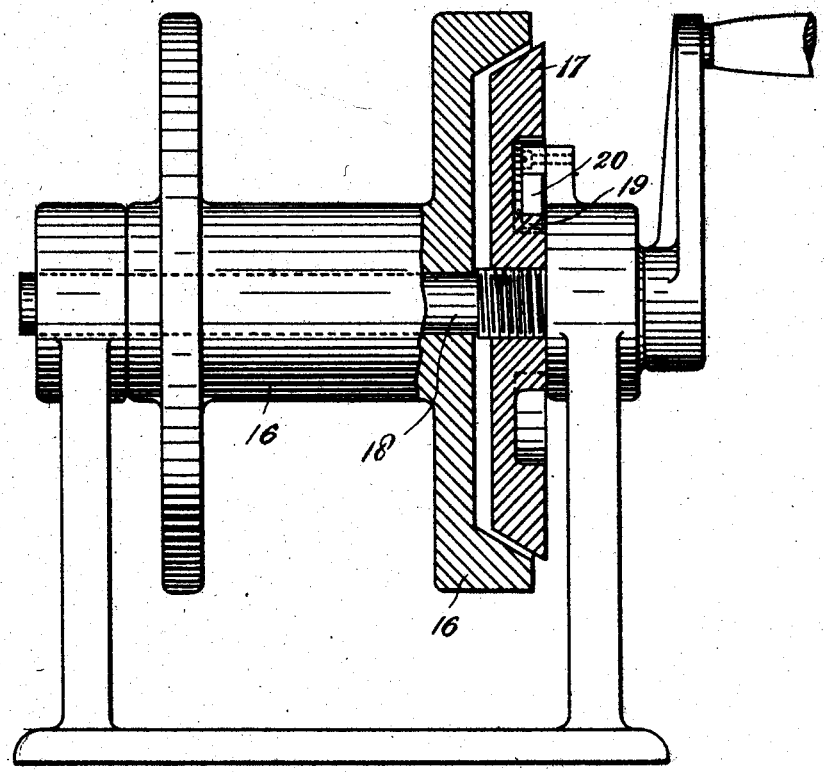
Fig: 6.

No. 787,030.

Patented April 11, 1905.

UNITED STATES PATENT OFFICE.

JOHN WILSON GILLIE, OF NORTH SHIELDS, ENGLAND.

APPARATUS FOR TAKING SOUNDINGS AT SEA.

SPECIFICATION forming part of Letters Patent No. 787,030, dated April 11, 1905.

Application filed March 19, 1904. Serial No. 198,928.

*To all whom it may concern:*

Be it known that I, JOHN WILSON GILLIE, nautical-instrument maker, a subject of the King of Great Britain, residing at New Quay, North Shields, in the county of Northumberland, England, have invented a new and useful Improved Apparatus for Taking Soundings at Sea, of which the following is a specification.

My invention relates to an improved apparatus for taking soundings at sea, in a river, or lake from the deck of a vessel or like position and this whether the vessel or the like is in motion at the time or not, and relates particularly to improvements in the depth-recorder and the reel and brake.

My invention is illustrated in the accompanying drawings, to which reference will be hereinafter made.

In the drawings, Figure 1 shows a front view of the improved depth-recorder in the position ready for use. Fig. 2 illustrates in section and on an enlarged scale the construction of the plug through which the water has access to the measuring-tube. Fig. 3 shows the measuring-tube; Fig. 4, the internal scale for the said tube. Fig. 5 is a diagrammatic end view of the reel and ratchet mechanism. Fig. 6 is an elevation and partial section of the reel and brake mechanism.

The depth-recorder comprises an outer frame or cage consisting, essentially, of three plates of suitable shape, the lower, 1, provided with a loop or loops or other equivalent means for conveniently suspending a sinker, the middle plate 2 having a slot, as shown, for the reception of the middle part of the measuring-tube, and the upper plate 3 provided at its center with an aperture screwed for the reception of the plug 4. These plates are firmly secured together by three or more uprights 5, 6, and 7, preferably as shown in the drawings. Above the plate 3 is provided a loop of wire or other convenient means for suspending the apparatus from the sounding-line, which is made of such a shape and size when secured to the upper plate 3 as to prevent the plug 4 being completely unscrewed from its socket, and so possibly lost or mislaid.

The measuring-tube 9 is open at its upper end and widens gradually, as shown, to its lower closed end and is formed of some tough transparent material, preferably celluloid. Within it is cemented or otherwise suitably fastened a suitably-shaped graduated scale 10 with its lower end about one-fifth of its length from the bottom of the tube, Fig. 4. This scale may be made of a thickness increasing upward and is preferably made with its lower end gradually tapering to a point, so as to increase the effect of the diminishing diameter of the measuring-tube. The object of this is to equalize the graduations, because as the depth increases, and consequently the compression within the tube, less volumes of water pass into the measuring vessel.

A special feature of my invention is illustrated in Fig. 2, which shows the adjustable plug 4. This plug is arranged to screw in the screw-socket 11, which forms part of the upper plate 3 and is used at the same time to close the open end of the tube 9 and to secure it in its place in the outer frame or cage. It is traversed by a horizontal perforation 12, which communicates at the axis of the plug with the vertical hole 13. The lower face of the plug is preferably provided with a washer or the like 14 to make a water-tight joint with the orifice of the measuring vessel 9.

My improvement in the reel and brake consists, essentially, of the addition of a pawl 20, attached to the frame carrying the reel in such a way that it drops into teeth formed in the back of the brake-plate 19, so that when the spindle 18 is revolved, by means of the usual handles, in the direction of the arrow the brake-plate being prevented by the pawl from turning with the spindle moves laterally away from the reel on the screw formed on the spindle and leaves the reel free to let the sounding-line 15 run out; but when the spindle is rotated in the opposite direction the brake-plate is wound against the reel, eventually stopping it, and the operator has only to continue the same motions of the handles to wind in the line and raise the depth-recorder and sinker.

The operation of the apparatus is as follows: The depth-recorder and suitable sinker are first attached to the line 15, and the tube 9, with the attached inclosed index 10, having been fixed in the position shown in Fig. 1 the plug 4 is screwed down tightly upon it. When a water-tight junction is effected between the measuring vessel 9 and the washer 14 of the plug 4, the horizontal perforation 12 of the said plug will be one or two turns below the level of the top of the socket, and consequently the only access which the water obtains to this perforation will be by following the turning of the screw-thread. In this way I secure the admission of water into the measuring-tube 9 only when there is a difference of pressure between the inside and outside of the tube. When there is no difference of pressure, no water can pass owing to the close fitting of the screw-threads. Thus the amount of water accumulating in the vessel forms a reliable indication of the depth to which the apparatus has been lowered. The plug having been firmly screwed down upon the measuring vessel 9, the apparatus is then lowered, by means of the sounding-line 15 unwinding from the drum 16, until the bottom is touched or the requisite depth attained. The running out of the line can be checked to any desired extent by winding up the brake-plate against the reel. When the sounding has been taken and the depth-recorder raised, the depth is shown by the height at which the water stands on the gage inside the tube. Before taking another sounding the tube is removed from the cage and carefully emptied. It is then replaced and the plug again screwed down on the open end.

What I claim is—

1. In apparatus for taking soundings, a frame, a screw-threaded aperture in said frame, a perforated plug adapted to screw in said aperture, a transparent removable measuring vessel of upwardly-diminishing diameter held in said frame by said plug and having its upper end in immediate communication therewith a graduated scale fixed in said measuring vessel and means for lowering and raising said frame.

2. In apparatus for taking soundings, a frame composed of three uprights having top, middle, and bottom plates secured to them, the top plate perforated and screw-threaded, the middle plate slotted, and the bottom plate recessed, a perforated plug adapted to screw in said aperture, a transparent measuring vessel in said frame of upwardly-diminishing diameter and having its upper end in communication with the perforation of the said plug, a graduated scale adapted to said measuring vessel and means for lowering and raising said frame.

3. In apparatus for taking soundings, a frame, a screw-threaded aperture in said frame, a screw-threaded plug adapted to screw in said aperture and having a horizontal perforation through its screw-threaded part, and a vertical downwardly-directed central perforation communicating with said horizontal perforation, a transparent measuring vessel in said frame of upwardly-diminishing diameter and having its upper end in communication with the perforation of the said plug, a graduated scale adapted to said measuring vessel and means for lowering and raising said frame.

4. In apparatus for taking soundings, a frame, a screw-threaded aperture in said frame, a perforated plug adapted to screw in said aperture and retain the measuring vessel in said frame, an upwardly-tapering transparent celluloid measuring vessel having its lower end closed and its upper end open and adapted to fit water-tight around the inferior orifice of the perforation in said plug and receive directly any liquid passing through the perforation of the said plug, a graduated scale fixed in said measuring vessel, and means for lowering and raising said frame.

5. In combination in a sounding apparatus, an outer frame, the perforated plug 4 screwed into the top plate of said frame, the measuring-tube 9 in water-tight connection with the said top plate and open to the lower orifice of the perforated plug 4, the upwardly-thickening scale 10 within said tube 9; and means for lowering and raising the frame, substantially as set forth.

In testimony whereof I have signed my name to this specification in the presence of two subscribing witnesses.

JOHN WILSON GILLIE.

Witnesses:
WILLIAM H. NIXON,
ARTHUR WILSON.